United States Patent
Khsiba et al.

(10) Patent No.: US 12,238,760 B2
(45) Date of Patent: Feb. 25, 2025

(54) PRE-EMPTION IN SIDELINK COMMUNICATIONS

(71) Applicant: JRD Communication (Shenzhen) LTD., Guangdong (CN)

(72) Inventors: Mohamed-Achraf Khsiba, Guangdong (CN); Umer Salim, Guangdong (CN); Virgile Garcia, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 356 days.

(21) Appl. No.: 17/630,176

(22) PCT Filed: Jul. 22, 2020

(86) PCT No.: PCT/CN2020/103454
§ 371 (c)(1),
(2) Date: Jan. 26, 2022

(87) PCT Pub. No.: WO2021/027510
PCT Pub. Date: Feb. 18, 2021

(65) Prior Publication Data
US 2022/0279536 A1    Sep. 1, 2022

Related U.S. Application Data

(60) Provisional application No. 62/884,696, filed on Aug. 9, 2019.

(51) Int. Cl.
*H04W 72/566*     (2023.01)
*H04W 72/1263*    (2023.01)
(Continued)

(52) U.S. Cl.
CPC ..... *H04W 72/569* (2023.01); *H04W 72/1263* (2013.01); *H04W 74/002* (2013.01); *H04W 74/0808* (2013.01)

(58) Field of Classification Search
CPC .......... H04W 72/569; H04W 72/1263; H04W 74/002; H04W 74/0808; H04W 72/40;
(Continued)

(56) References Cited

U.S. PATENT DOCUMENTS 10,278,158 B2    4/2019 Rudolf et al.
2018/0234889 A1* 8/2018 Baghel ................. H04W 24/08
(Continued)

FOREIGN PATENT DOCUMENTS

CN    1538767     10/2004
CN    106797644    5/2017
(Continued)

OTHER PUBLICATIONS

Nokia et al., âDiscussion of Resource Allocation for Sidelink a Mode 2,â 3GPP TSG RAN WG1 Meeting #97, R1-1906076, Reno, USA, May 13-17, 2019, pp. 1-7 (Year: 2019).*

(Continued)

*Primary Examiner* — Un C Cho
*Assistant Examiner* — Lalita W Pace (57) ABSTRACT

Methods for pre-emption of transmission resources in sidelink communications in a cellular network. A reservation message for resources which collide with previously-reserved resources serves as a pre-emption indicator.

13 Claims, 4 Drawing Sheets

(51) Int. Cl.
*H04W 74/00* (2009.01)
*H04W 74/0808* (2024.01)

(58) Field of Classification Search
CPC ..... H04W 72/56; H04W 72/25; H04W 72/20; H04W 72/02; H04W 72/04; H04W 72/12
See application file for complete search history.

(56) References Cited

U.S. PATENT DOCUMENTS

| | | | |
|---|---|---|---|
| 2018/0234994 A1 | 8/2018 | Yasukawa et al. | |
| 2019/0098612 A1 | 3/2019 | Babaei et al. | |
| 2019/0239193 A1 | 8/2019 | Rudolf | |
| 2020/0229144 A1* | 7/2020 | Bharadwaj | H04W 72/044 |
| 2021/0307032 A1* | 9/2021 | Osawa | H04W 72/569 |
| 2021/0352710 A1* | 11/2021 | Lu | H04L 5/0044 |
| 2022/0006569 A1* | 1/2022 | Lee | H04W 72/02 |
| 2022/0022204 A1* | 1/2022 | Fehrenbach | H04W 72/12 |
| 2023/0018107 A1* | 1/2023 | Wang | H04W 72/02 |

FOREIGN PATENT DOCUMENTS

| | | |
|---|---|---|
| CN | 107852699 | 3/2018 |
| WO | WO 2017/026973 | 2/2017 |
| WO | WO 2017/105545 | 6/2017 |
| WO | WO 2018/142376 | 8/2018 |
| WO | WO-2018174690 A2 * 9/2018 | ........... H04L 27/261 |
| WO | WO 2019/032844 | 2/2019 |

OTHER PUBLICATIONS

NTT Docomo, âNR Sideline Resource Allocation Mechanism Mode 1,â 3GPP TSG RAN WG1 Meeting #97, R1-1906206, Reno, USA, May 13-17, 2019, pp. 1-6 (Year: 2019).*

Supplementary European Search Report and the European Search Opinion Dated Jul. 12, 2023 From the European Patent Office Re. Application No. 20853035.2. (11 Pages).

Intel Corporation "Summary for AI 7.2.4.2.2 Mode-2 Resource Allocation", Intel Corporation, XP051739984, 3GPP Draft, R1-1907699, Summary of 5G V2X Mode 2 V1, 3rd Generation Partnership Project (3GPP), 3GPP TSG RAN WG1 Meeting #97, Reno, NV, USA, May 13-17, 2019, p. 1-26, May 13, 2019.

International Search Report and the Written Opinion Dated Sep. 27, 2020 From the International Searching Authority Re. Application No. PCT/CN2020/103454. (8 Pages).

Notification of Office Action and Search Report Dated Sep. 27, 2024 From the State Intellectual Property Office of the People's Republic of China Re. Application No. 202080054668.8 and Its Translation into English. (19 Pages).

* cited by examiner

PRE-EMPTION IN SIDELINK COMMUNICATIONS

RELATED APPLICATIONS

This application is a National Phase of PCT Patent Application No. PCT/CN2020/103454 having International filing date of Jul. 22, 2020, which claims the benefit of priority under 35 USC § 119 (e) of U.S. Provisional Patent Application No. 62/884,696 filed on Aug. 9, 2019. The contents of the above applications are all incorporated by reference as if fully set forth herein in their entirety.

FIELD AND BACKGROUND OF THE INVENTION

This invention relates to the wireless communication systems and particularly to distributed SL resource allocation and pre-emption mechanisms in the context of sidelink communication e.g. in cellular Vehicle-to-Everything (V2X) applications.

In Re116 V2X WI, 3GPP introduced new applications for V2X communications such as assisted/autonomous driving and car platooning in addition to classic use cases inherited from legacy LTE V2X. Therefore, different packet priority levels and delay budgets are considered in NR V2X.

In order to meet the new requirements in terms of stringent reliability and latency for UEs operating in mode 2, UEs should be allowed to access the channel within their packet delay budget while maintaining a sufficient reliability level. Hence, the investigation of pre-emption operation in V2X mode 2 is of great interest. Resource pre-emption consists in the opportunistic full or partial use, by a UE (the pre-empter), of a block resources that have been already reserved or assigned to a UE for a future transmission (the pre-empted) to allow data transmission of higher Quality of Service QoS. The UE pre-empting a resource should notify the resource pre-emption to the pre-empted UE in order to refrain from transmission and hence avoid packet collision on the resource. Moreover, the pre-empted UE should select a new resource to resume its pre-empted transmission.

In LTE V2X mode 4 (equivalent to NR V2X mode2), there is no explicit mechanism for a UE having higher priority level packet to pre-empt a UE that already reserved a resource with lower priority level. This disclosure seek to address the problem of sidelink pre-emption for NR V2X mode-2 operation. The absence of a centralized node (gNB for example) having a clear view of resource scheduling status and controlling the pre-emption operation leads to ambiguity regarding the roles of each of the UEs i.e. when is the pre-empting UE allowed to pre-empt a SL resource and when is the pre-empted UE required to monitor for a potential pre-emption indication (PI). Furthermore, monitoring PIs is power-consuming and a waste of duplexing time. This it should be kept only when necessary. Regarding pre-emption, many companies in the 3GPP community motivated the need of having a pre-emption mechanism in V2X mode 2.

In many RAN1 #97 Tdocs, pre-emption was considered as relevant for V2X mode 2 to efficiently fulfil QoS requirements in high congestion scenarios. The feature-lead summary R1-1907771 (and R1-1907699) for AI 7.2.4.2.2 Mode-2 Resource Allocation proposed the discussion of pre-emption mechanism:

Support resource pre-emption mechanism (s) for Mode-2

If enabled, the pre-emption mechanism should trigger resource reselection or resource release in case of a collision with resources of a higher priority UE FFS other details We provide below an overview of companies' proposals concerning resource pre-emption for V2X mode2:

OPPO R1-1904922 & R1-1906477:

In order to ensure the target PSSCH resource booking is received by others, the pre-emption message can be transmitted twice in two PSCCH resources that are separated in time and frequency, in case some UEs could not receive the message in the first transmission due to half-duplex issue or Tx collision with other pre-emptions.

Ericsson R1-1905477:

we believe that the SCI will also carry other information that is directly related to resource utilization such as requests for HARQ feedback and pre-emption messages. The former allows the decoding UE to identify which resources are used for PSFCH transmission and avoid using them. The latter allows the pre-empted UE to stop transmission. In our view, such fields should be contained in SCI and extracting by the sensing procedure.

Ericsson R1-1907136:

Consider the following alternatives for signaling pre-emption signaling:

Alt. 1: Standalone PSCCH spanning the entire slot.

Alt. 2: PSCCH+PSSCH carrying the urgent data.

LG R1-1905439:

"TDMed transmission of SA and data" is beneficial for preemption. If there is a gap between data and SA including the preemption indication, UE can have more chance to detect the preemption indication. This means that it is possible to achieve better collision avoidance among different priority packet transmissions. Also, RSU relay mechanism can be considered for the preemption operation. That is, if a UE requiring preempted resources for high priority packet transmission, it transmit a request message with the preemption indication or resources to a near RSU. Then, RSU can relay that kind of message to other UE (s) and selecting the preempted resources can be avoided by those UE (s).

SUMMARY OF THE INVENTION

In this disclosure we discuss the pre-emption mechanism and associated problems where all UEs involved are out of coverage i.e. V2X mode 2. We propose a reduced signalling pre-emption design with little standardization effort allowing for a distributed pre-emption decision where both parties decide autonomously to be part of the pre-emption operation. This decision is based primarily on the loading of the sidelink channel. Hence it can be suitably based upon the channel busy ratio (CBR) estimated by all UEs intending to transmit in a SL resource pool. Suitable thresholds in terms of channel loading (or CBR) may be defined which trigger the users to start listening for a potential pre-emption. This can be made more meaningful by defining the composite thresholds with the traffic priority and the channel loading. The users with high priority traffic also pre-empt the other users when the sidelink channel loading (e.g. in terms of CBR) exceeds a certain threshold. That is, the UE likely to be pre-empted would monitor a potential PI whereas the pre-empting would transmit a PI. To ensure the reception of pre-emption, different thresholds can be defined for the pre-emptor and the UE who gets pre-empted. More reliable approach is an indication in the Sidelink Control Information (SCI) from the low priority UEs that they are listening to pre-emption signalling. Moreover, we propose enhancements to assist the UE in the selection and reservation transmission of SL resource to be pre-empted.

SUMMARY

The current disclosure seeks to provide: —

Distributed pre-emption mechanism without ambiguity in the absence of a centralized control node.

Reduced pre-emption monitoring overhead for the UE likely to be pre-empted.

Enhanced QoS for UEs intending to transmit high priority and/or delay limited packets.

Reduced packet collision risk.

There is provided a method for allocation and pre-emption of transmission resources for sidelink communications in a cellular wireless communication system, the method comprising the steps of at a first UE receiving a transmission resource reservation message from a second UE, the reservation message being for first transmission resources for a sidelink transmission by the second UE at a first priority level; at the first UE selecting second transmission resources for a sidelink transmission by the first UE at a second priority level which is higher than the first priority level, the second transmission resources overlapping with at least part of the first transmission resources; and at the first UE transmitting a sidelink control information message which indicates reservation of the second transmission resources by the first UE, and which indicates to the second UE that the overlapping first transmission resources are pre-empted.

There is also provided a method for allocation and pre-emption of transmission resources for sidelink communications in a cellular wireless communication system, the method comprising the steps of at a first UE transmitting a first transmission resource reservation message, the reservation message being for first transmission resources for a sidelink transmission by the first UE at a first priority level; and at the first UE receiving a sidelink control information message from a second UE, which sidelink control information message indicates reservation of second transmission resources by the second UE for a sidelink transmission by the second UE at a higher priority level than the first priority level, which second transmission resources overlap with the first transmission resources, and which indicates to the first UE that the overlapping first transmission resources are pre-empted.

DESCRIPTION OF SPECIFIC EMBODIMENTS OF THE INVENTION

In out of coverage scenario, NR mode 2 SL resource allocation is used where the UE autonomously selects its transmission resources based on sensing procedure result. The sensing operation allows for SL resource collision reduction where a UE intending to transmit, should detect SL resource reservation patterns by other UEs. The resources exceeding a given threshold on RSRP primarily and RSSI secondly are excluded in SL resource selection procedure. In the same way, when an available SL resource has been selected, the UE announces SL resource reservation indication in broadcast signalling before its transmission on that resource. Packet priority level and packet delay budget are parameters that may affect the QoS of packets transmission. In RAN1 NR V2X Mode 2 discussion, information on reserved resources and QoS/priority is being supported by the majority of companies to be included in the SL resource reservation SCI. In order to meet the needed QoS in the congested SL resource pool, a UE carrying a high priority level packet can pre-empt packet transmission with lower priority levels.

Pre-emption mechanism relies on the detection of SL resource reservation sent by the lower priority level UE and the pre-emption indication message sent by the high priority level UE to inform that the pre-empted SL resource will be used by another UE and that the lower priority UE should refrain from transmission in order to avoid packet collision.

In NR-Uu context, resource allocation and pre-emption are controlled by a centralized entity gNB which receives typically the PI and forwards it to the impacted UE (s) to refrain from transmission. In mode-2 V2X, the absence of a centralized node, constrains the pre-empting and the pre-empted UEs to autonomously decide and execute the pre-emption mechanism. That is, the UE that wants to pre-empt a given SL resource, has to transmit the PI. This pre-emption indication needs to be transmitted with suitable reliability and enough time in advance before the target pre-empted resource in order to be received and processed by the pre-empted UE. To be able to stop a reserved transmission, the UEs should be able to decide autonomously when and how they will listen to PI. A straight forward approach can be that the UEs after transmitting the resource reservation indication listen for a potential PI prior to the actual transmission.

While the above-mentioned classic way of pre-emption in mode-2 could work, it causes a large monitoring overhead for the potentially pre-empted UE, though. Hence, the pre-empted UE has to limit the number of monitoring occasions autonomously without the assistance of a gNB. Similarly, in a distributed system, it's not clear when a certain UE may transmit the pre-emption indication.

Therefore, we propose that the pre-emption triggering (by the pre-empting UE) and monitoring (by the other UEs who may undergo the pre-emption) are decided by the UEs based mainly on packets priority and channel occupancy ratio resulting from sensing procedure. Based on these parameters, a UE having a high priority packet knows if it has the right to pre-empt a given SL resource. Similarly, a UE having reserved a SL resource for a later transmission knows if it is likely to be pre-empted and how monitoring should be performed (timing occasions and periodicity).

From a pre-empting UE point of view, a pre-emption could be triggered based primarily when this user gets high priority traffic at a time where the channel loading is quite high such that the packet (s) cannot be expected to meet their QoS targets.

This disclosure proposes a simple yet elegant and efficient approach for pre-emption design in V2X mode 2. In this approach, the pre-emption decision is based on the loading of the sidelink channel. Hence it can be suitably based upon the Channel Busy Ratio (CBR) estimated by all UEs intending to transmit in a SL resource pool. CBR can be calculated in different ways to indicate the loading of the sidelink channel. A first definition of CBR could be the ratio of available resources in the sidelink channel. A second one could take into account the contiguousness of available resource across the sidelink channel. That is, if many small available resources are too scattered across the channel, then they'll be less likely to be used by a UE which prefers to transmit on a single block of contiguous ressources.

CBR can be calculated in many ways:
Alt1: a ratio of available resources in the sidelink channel.
Alt2: a ratio taking into account the scattering of available resource across the sidelink channel.

The users intending to transmit a packet are required to listen to sidelink channel in mode 2 as the typical mechanism, thus they have the channel loading overview. Suitable thresholds in terms of channel loading (or CBR) may be defined which trigger the users to start listening for a potential pre-emption. This can be made more meaningful by defining the composite thresholds with the traffic priority and the channel loading. Thus, the users transmitting low priority traffic are more prone to get pre-empted and thus listen early in terms of CBR for a potential PI.

Define composite CBR thresholds with traffic priority in order to make UEs with lowest packet priority listen more for potential PI.

The users with high priority traffic may pre-empt the other users when the sidelink channel loading (e.g. in terms of CBR) exceeds a certain threshold. That is, the UE likely to be pre-empted would monitor a potential PI whereas the pre-empting user would transmit a PI. To ensure the reception of pre-emption, different thresholds can be defined for the pre-empting UE and the UE who gets pre-empted. Different thresholds at two ends of pre-emption help the fact that the sensing performed at these two users may result in different channel loading view as these users are not necessarily co-located. Nevertheless, these users will not be very far apart either as the pre-empting UE is able to listen and decode the resource reservation indication from the other user before sending the PI.

Different suitable channel loading thresholds result in good probability that the UE who gets pre-empted will listen to the PI and will stop its transmission on the resource, it has reserved prior to receiving the PI. Nevertheless, some transmissions will face collisions when the user is not listening to the PI or fails to decode it, both of which will result that the user with a prior reservation will not stop its transmission on the reserved resources.

To avoid the confusion at the UE who sends or plans to send the PI whether the target user, the user whose resource it plans to pre-empt, is listening to PI or not, this disclosure proposes another novel strategy. When the channel loading exceeds the threshold where the users might be pre-empted, the users transmit the pre-emption-READY indication in the resource reservation indication (possibly a single bit flag). All the users in the vicinity who decode this resource reservation indication, as part of normal sensing procedure, thus, get the information that this particular user will listen to a potential PI. Now if another user with high priority traffic needs to pre-empt to be able to transmit its packet within its QoS target, it will pre-empt only the users who have indicated the "Pre-emption-READY" indication as part of resource reservation indication.

To avoid missing the detection of PI indication, a 1-bit "pre-emption-READY" flag can be included in the resource reservation SCI from UEs who are likely to get pre-empted to inform other UEs that they are ready to listen to PI.

Other than handling the distributed decisions when the pre-emption can be done, when the users listen to the PI and when they transmit, the other most important invention of this disclosure is related to the pre-emption signaling. NR-Uu standardized the standalone pre-emption signaling which informs the previously scheduled user about the pre-emption event. This disclosure proposes that the normal scheduling indication serves the purpose of resource pre-emption. The UE with higher priority traffic selects the suitable UE to be pre-empted but does not send an explicit signaling for pre-emption. It sends the scheduling indication which provides the resource indication, potentially along with other control parameters. This scheduling indication is sent in a pre-defined (pre-configured) time window in relation to the resource which is targeted. Thus, the UE who had made the prior reservation will listen to the scheduling indications from neighboring UEs in this pre-defined time window. A resource reservation indication transmitted here with overlapping resources to the prior scheduling thus serves the purpose of pre-emption resulting in a very efficient design of pre-emption signaling. This is very interesting in the sense that a single scheduling may thus pre-empt multiple prior scheduling of lower priority with this design without any additional signaling overhead.

To reduce signaling, in a pre-emption context, reservation SCI can serve both as a reservation indication intended to all UEs and as a pre-emption indication for UEs whose prior reserved resource overlaps totally or partially with the transmitted reservation SCI.

A. Pre-Emption Based on Lack of Resources:

A UE having a packet to transmit should perform a sensing procedure during a window in which it learns the transmission patterns in the SL resource pool and then excludes resources that are already reserved when it intends to transmit. We propose that beyond a given threshold of resources occupancy, the UEs start listening to the pre-emption indication. A simple approach would be to define a single threshold in terms of channel occupancy, such as CBR value, beyond which the users start monitoring the PI. A more meaningful approach would be to define multiple values for channel loading for different traffic priorities a user is transmitting. The rationale behind is the fact that if pre-emption needs to be done, it would make sense to pre-empt the lowest priority traffic among the packets which are occupying the resources.

Additionally, the channel occupancy measure used for (de-) activating the pre-emption monitoring can take into account the size of resource that will be used by the ongoing reservation, so that it reflects the occupancy at the time of the transmission. For example, if a channel is empty but the planed transmission uses all the resources available for some time, then it can consider that the channel occupancy is maxed for the decision of pre-emption monitoring.

Figure 1:
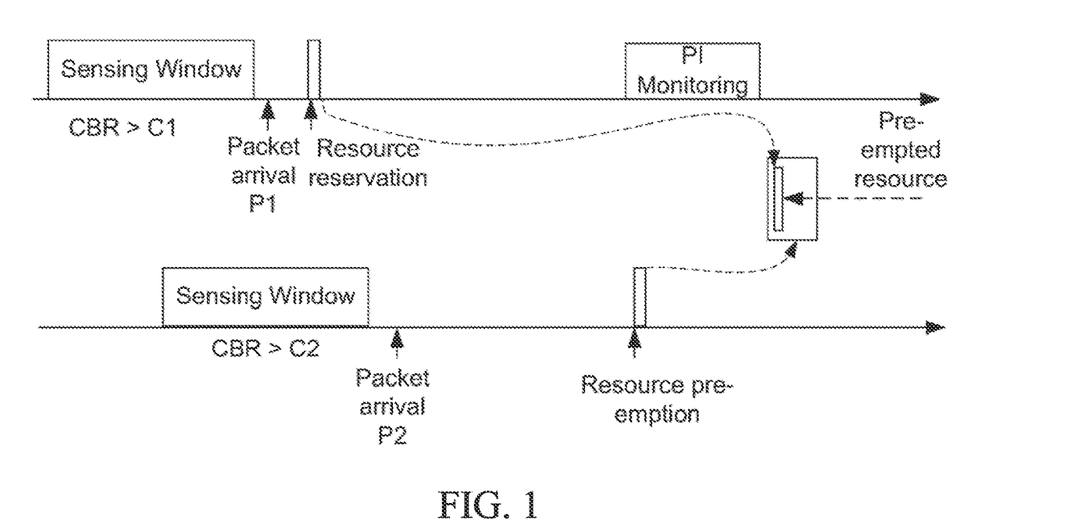
FIGS. 1, 2, 3, 4 and 5 show various examples of pre-emption for side link communications.

A pre-empting user can only pre-empt resources that are reserved for a packet of lower priority. In FIG. 1, we depict a typical scenario of pre-emption based on lack of resources. For UE1 (in blue) and UE2 (in orange), UE1 has a packet of priority level p1 to transmit. Prior to resource selection, a sensing procedure should be performed UE in order to exclude resources that have been reserved by other UES. After selecting a suitable SL resource, it reserves this later by sending the SL resource reservation indication. This reservation can be sent as first stage of two-stage SCI or a single stage SCI. If UE1 sensing outcome indicates a SL resource occupancy over a threshold C1 then UE1 is required to perform PI monitoring before its transmission. This short-term PI monitoring procedure can coincide with the last or last few SCI transmission occasion before its transmission instant. In such a way UE1 can autonomously decide if it is likely to be pre-empted and, in that case, reduce the PI monitoring overhead.

Obviously, if UE1 has a packet with the highest priority, then it could be exempted from monitoring PI.

Assume now that a UE2 performs its sensing procedure that overlaps UE1's reservation message, i.e. UE2 is aware of future UE1 transmission parameters on a given SL resource. Now if UE2 has a packet of priority level P2 P2>P1) and that it's sensing procedure outcome indicates a channel occupancy over a threshold C2 then it can decide to pre-empt UE1 transmission to satisfy its QoS. The channel occupancy ratio C2 for the pre-empting should be higher or equal to channel occupancy ratio C1 for the pre-empted i.e. C2>=C1. The reason is that pre-empting decision autonomously taken by the UE2 should be harder than pre-emption monitoring decision to reduce the number of pre-emption decisions and restrain it only for extreme cases which in turn reduces the number of collision incidents.

Conservative CBR thresholds can be set in order to limit the pre-emption use from UEs with high priority packets and also guarantee pre-emption monitoring from UEs likely to be pre-empted.

In order to notify SL resource pre-emption to the pre-empted UE1, UE2 should transmit a SL resource PI in the last or few last occasion (s) before the targeted UE1 transmission to be pre-empted.

NR-Uu has defined pre-emption mechanisms and special group common DCIs have been standardized for the purpose which are transmitted in the specially configured control resources, CORESETs. Such design becomes complicated in V2X mode 2 due to absence of any centralized scheduler. This disclosure proposes a very elegant design here by allowing a normal SCI to serve as PI in case the resource scheduling occurs on the prior reserved resources. Thus, the PI can be sent as a normal SL resource reservation SCI for UE2 transmission. The UE1 monitoring last/few last SCIs before its transmission, compares its reserved SL resource with pre-empted SL resource indicated in the PI. If the reserved resources overlap partially with the reserved SL resource by UE2, then UE1 refrains from transmission and starts a new sensing/reservation procedure for another SL resource.

PI is sent in the last/few last SCI occasions before transmission instant. The number of SCI occasions to be monitored can be pre-configured.

To limit the decoding complexity at the users to decode a potential PI, it would make sense to define a window within which a pre-empting UE will transmit its resource reservation, which serves as pre-emption indication. This SCI (or the first stage of SCI) will schedule the SL resource as a normal SCI for its intended receiver, and in addition, it serves as pre-emption indication for the UE who had reserved the overlapping resource in a prior control (SCI). This, double utilization results in a very efficient pre-emption signalling, adding to the system efficiency.

Figure 2:
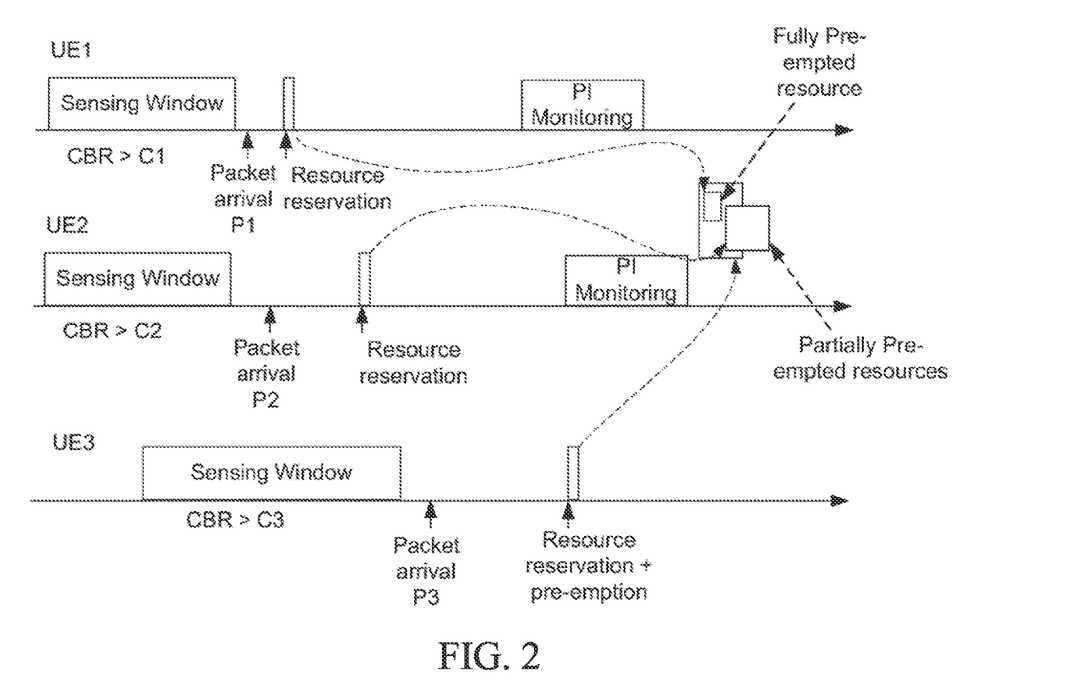

One pre-emption indication can impact multiple UEs intending to transmit low priority UEs. In FIG. 2, we illustrate this scenario. UE1, UE2 and UE3 intending to transmit packets of priorities P1, P2 and P3 respectively where P1<P2<P3. CBR thresholds can be calculated as a function of the priority of the packet to transmit. Conservative thresholds can be chosen in order to avoid that a UE with a low-priority packet to transmit misses a PI. Hence, we assume that C3<C2<C1. Low-priority packet UEs can be impacted differently. While the resource selected by the pre-empting UE can arbitrarily, totally or partially overlap other UEs resources, it is preferable to partially pre-empt resources reserved for higher priority packets. That is, in the example illustrated in FIG. 2, UE3 pre-empts partially the resource reserved by UE2 and totally pre-empts the one reserved by UE1 (as UE1 packet priority P1<UE2 packet priority P2). Regarding the reliability level of the PI transmitted to multiple UEs, each pre-empted UE should receive it with an adequate aggregation level to be able to decode it. Hence, the pre-empting UE has to select the maximum value among all needed aggregation levels in order to ensure the PI decoding with high probability.

B. Pre-Emption Based on a Limited Delay Budget:

In this section we address the problem of the expiry of a packet delay budget for all packet types and priorities. This can be the case for example, of a packet of an arbitrary priority which failed to select a SL resource following one/many sensing windows and which delay budget expires soon. Note that a UE can only pre-empt resources reserved for higher priority packets. To allow the packet transmission within the time budget, some solutions are proposed:

1. Short-Term Sensing Instead of Long-Term Sensing+Pre-Emption

Figure 3:
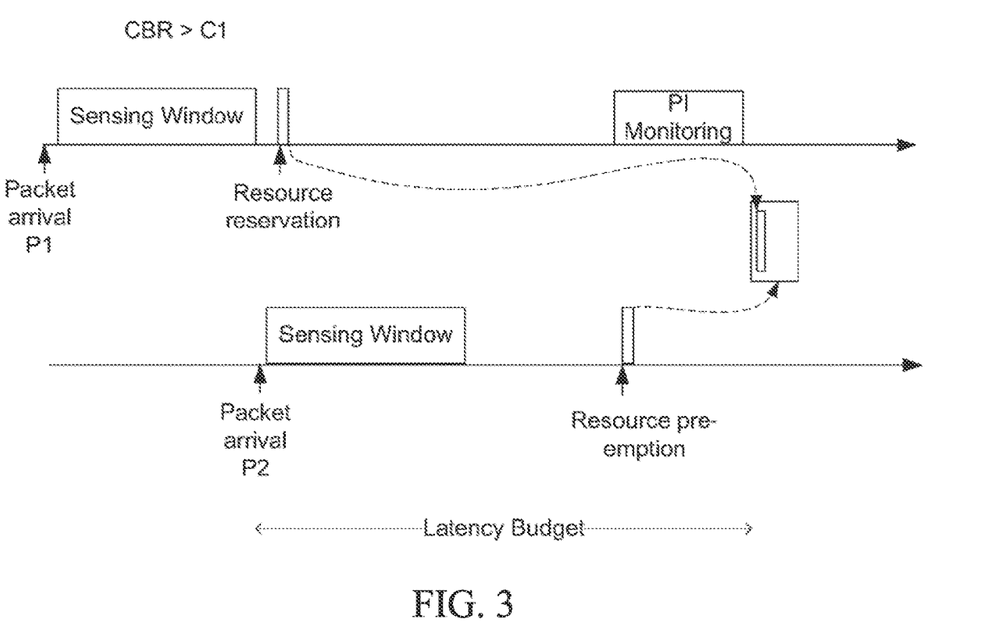

In this scheme depicted in FIG. 3, UE2 having a packet of a given priority level approaching the transmission deadline, will perform a short-term sensing window instead of classic long-term sensing window to allow for a fast sensing and pre-emption procedures. As mentioned in the previous section, UE1 PI monitoring decision is based on the CBR resulting from it sensing procedure. UE2 pre-emption decision is also based on the CBR resulting from its short-term sensing window. The threshold CBR threshold C2 could be maintained to a nominal value or decreased depending on the remaining time budget before transmission deadline. CBR thresholds for pre-empting UE should be anyway higher or equal to CBR of the pre-empted UE.

The threshold CBR threshold for the potentially pre-empting UE could be maintained to a nominal value or decreased depending on the remaining time budget before transmission deadline.

UE2 selects then a SL resource to pre-empt satisfying its packet size and delay budget and transmits in broadcast a SL resource reservation message which will be considered as a pre-emption indication from pre-empted UE1 point of view. As clearly stated before, pre-emption could only target packets of an inferior priority level.

2. Progressive Sensing Window Size:

In case of a SL resource selection failure following one/many sensing procedure (s), UE intending to transmit a packet of a given priority level could switch to progressively reduced sensing window sizes where pre-emption is enabled if CBR threshold is met.

Progressively reduced sensing window sizes can be used by UEs failing one or many times to reserve a resource.

3. Progressive CBR for a Fixed Size Sensing Window:

In case of a SL resource selection failure following one/many sensing procedure (s), UE intending to transmit a packet of a given priority level can progressively reduce the CBR threshold for pre-emption decision. Relaxing the threshold constraint progressively has the advantage of allowing UEs with a critical time budget to access the medium easier and hence meet QoS requirements for all packet priority levels. CBR thresholds for pre-empting UE should be anyway higher or equal to CBR of the pre-empted UE.

Progressively reduced CBR threshold for pre-emption decision can be used by UEs failing one or many times to reserve a resource.

Note that, as the first pre-emption triggering case, even if a UE decides to pre-empt a SL resource because of packet delay budget constraint, if the packet is of low priority, then the UE should perform short term sensing sufficient time before its transmission because it could be pre-empted itself by another UE.

C. Enhancements:

1. Pre-Empted SL Resource Selection Parameters:

In addition to CBR as a primary trigger for SL resource pre-emption decision, other parameters could be involved to fine tune the pre-empted SL resource selection procedure. For a pre-empting UE, if two blocks of resources have equivalent latency and reliability aspects, then priority should be given to resources impacting a smaller number of users. Then, preference should be given to SL resources representing the highest difference between pre-empted and pre-empting packet.

Moreover, if in sensing procedure, a SL resource reservation message indicates the transmission order i.e. first transmission, retransmission 1, retransmission 2, etc., then pre-emption preference should be given to higher order retransmission resources in order to avoid penalizing first transmissions.

Pre-emption preference should be given to higher order retransmission resources in order to avoid penalizing first transmissions.

2. Pre-Emption Indication Reliability:

In order to avoid packet collision, the pre-empting UE should guarantee a successful pre-emption indication reception by the pre-empted UE and preferably its intended receiver (to reduce unnecessary decoding effort of a pre-empted SL resource). Hence, PI should be sent in broadcast mode. Moreover, if SCI is considered as a mean of SL resource reservation and pre-emption, MCS and aggregation level of the PSCCH carrying the SCI should be chosen in a manner to guarantee its successful decoding by the pre-empted UE. If available resources for PSCCH cannot guarantee the successful reception, then the UE intending to pre-empt should cancel its pre-emption decision.

UE intending to pre-empt should cancel its pre-emption decision If available resources for PSCCH cannot guarantee the successful reception at the pre-empted UE side.

3. Pre-Emption Signalling:

Throughout this document, SCI was considered as a potential signalling for SL resource reservation messages which can in turn serve as a pre-emption indication from pre-empted UE point of view. Although this scheme does not require new signalling standardization effort, it remains valid for any PI signalling such as in an existing or a new dedicated channel.

4. Pre-Emption Capability Exchange Between UEs:

Pre-emption monitoring capability could be signalled via RRC or equivalent distributed configuration messages if a connection is being or is already established between users. Thus, a pre-empting UE should select resources that were reserved by pre-emption monitoring capable UEs. This capability exchange can help avoid incompatibility between UEs where a UE not supporting pre-emption for V2X mode2 gets pre-empted a UE supporting the feature.

Pre-emption monitoring capability could be signalled via RRC or equivalent distributed configuration messages.

Figure 4:
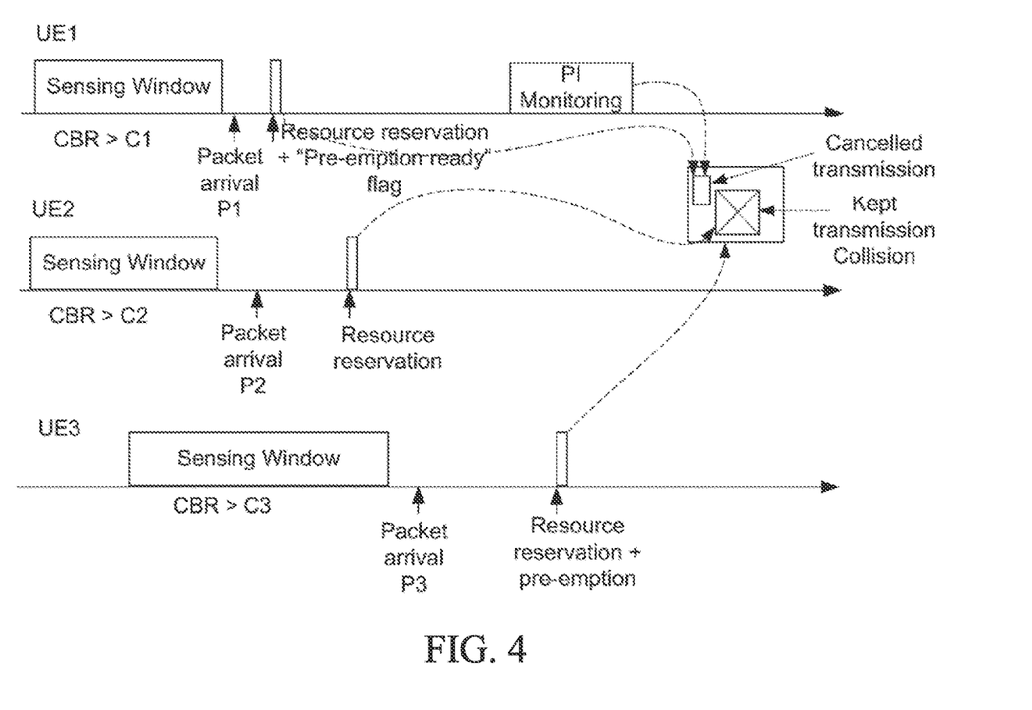

5. Explicit Pre-Emption Monitoring Advertisement:

Pre-emption indication decoding should be ensured in order to guarantee lower collision risk between packets due to pre-emption. Therefore, a potentially pre-empted UE can include a 1-bit flag "pre-emption-READY" in its reservation SCI to notify other UEs of its pre-emption monitoring capability. We illustrate in FIG. 4 the case of UE1 and UE2 reserving adjacent resources for their packets of priority P1 and P2 respectively. For its transmission, UE1 supports pre-emption option and includes the 1-bit "pre-emption-Ready" flag in his reservation SCI. Another UE3 intending to transmit a high priority packet (priority P3) decides then to pre-empt the future transmissions of UE1 and UE2. Only UE1 monitors for any potential PI impacting his transmission. Collision is therefore avoided for UE1 but not for UE2.

A UE intending to pre-empt has to select preferably resources impacting UEs having transmitted the "pre-emption-Ready" flag in order to minimize the collision risk.

Figure 5:
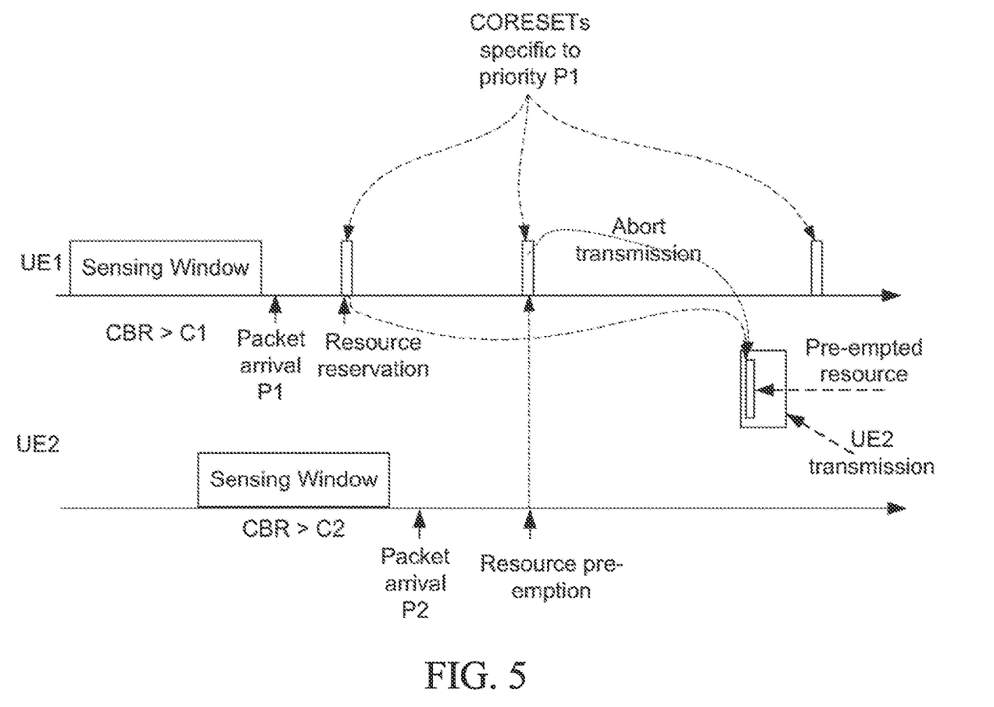

6. Pre-Emption in Packet-Priority Specific CORESETs:

In sidelink, Control Resource Sets can be packet-priority dependent i.e. each UE intending to transmit a packet of priority P1 shall transmit a resource reservation indication in special coreset specific for priority P1. In this way, another UE intending to transmit a packet with high priority P2 (P2>P1) and when CBR value exceeds a given threshold, it can pre-empt the transmission of a lower priority, say P1. Then, it transmits its resource reservation indication acting also as a pre-emption indication in the coreset specific to the priority of the packet getting pre-empted. Therefore, the UE of lower priority, after its reservation, shall only monitor the coresets specific to its packet priority P1 which reduces the PI monitoring overhead. This mechanism is illustrated in FIG. 5.

Resource reservation and pre-emption of a given packet priority should be transmitted in coresets specific to that priority.

Figure 6:
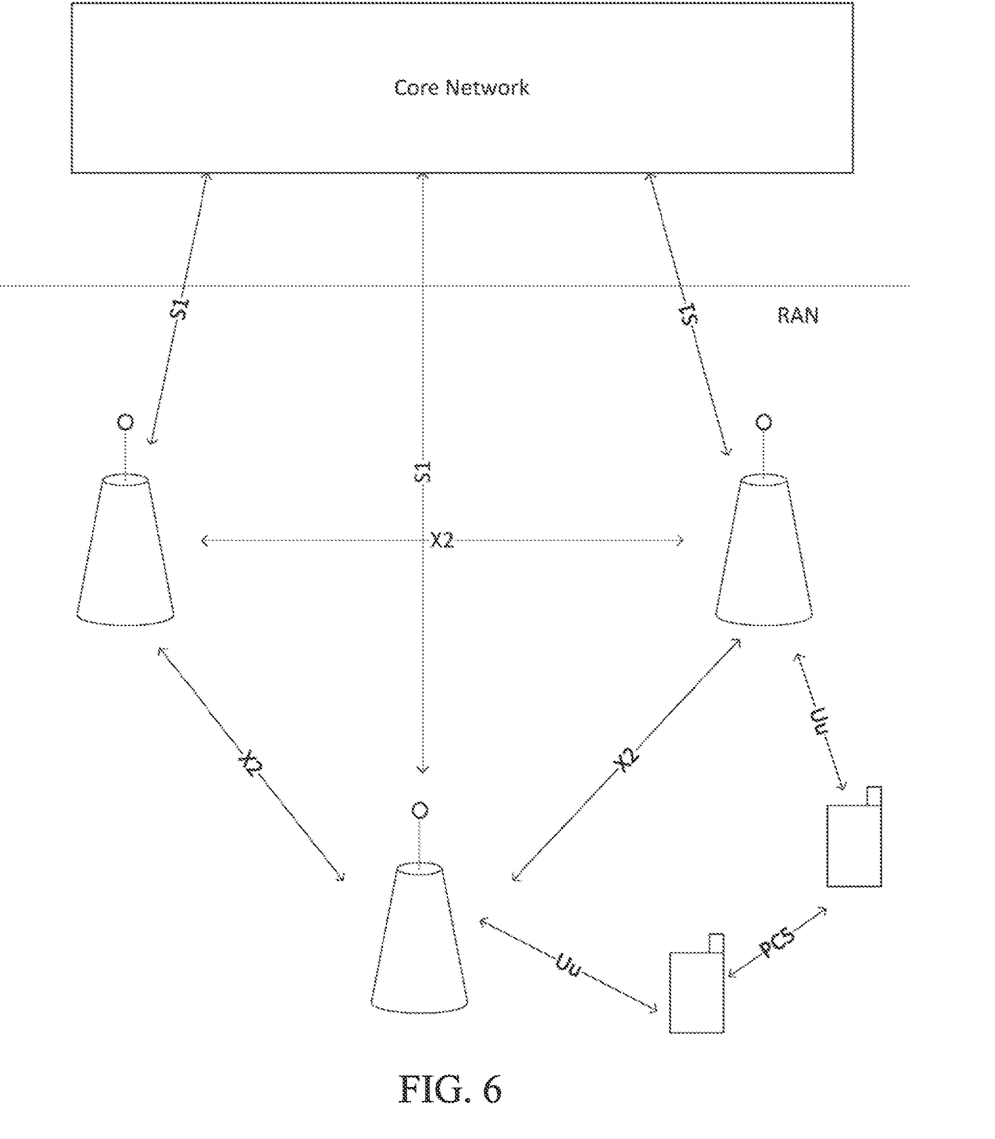
FIG. 6 shows selected elements of a cellular communications system.

FIG. 6 shows a schematic diagram of three base stations (for example, eNB or gNBs depending on the particular cellular standard and terminology) forming a cellular network in which the disclosure above may be implemented. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 6 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD)® read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims.

Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method for allocation and pre-emption of transmission resources for sidelink communications in a cellular wireless communication system, the method comprising the steps of:
   at a first UE receiving a transmission resource reservation message from a second UE, the reservation message being for first transmission resources for a sidelink transmission by the second UE at a first priority level;
   at the first UE selecting second transmission resources for a sidelink transmission by the first UE at a second priority level which is higher than the first priority level, the second transmission resources overlapping with at least part of the first transmission resources; and
   at the first UE transmitting a sidelink control information message which indicates reservation of the second transmission resources by the first UE, and which indicates to the second UE that the overlapping first transmission resources are pre-empted;
   wherein the method further comprises:
   estimating a channel busy ratio (CBR) of a sidelink resource pool associated with a sidelink channel, wherein the CBR is indicative of loading of the sidelink channel;
   selecting the second transmission resources or making a pre-emption decision based on whether the estimated CBR is greater than a pre-defined CBR threshold;
   wherein the first UE that fails to reserve a resource after a predetermined number of attempts reduces the pre-defined CBR threshold.

2. A method for allocation and pre-emption of transmission resources for sidelink communications in a cellular wireless communication system, the method comprising the steps of:
   at a first UE transmitting a first transmission resource reservation message, the reservation message being for first transmission resources for a sidelink transmission by the first UE at a first priority level; and
   at the first UE receiving a sidelink control information message from a second UE, which sidelink control information message indicates reservation of second transmission resources by the second UE for a sidelink transmission by the second UE at a higher priority level than the first priority level, which second transmission resources overlap with the first transmission resources, and which indicates to the first UE that the overlapping first transmission resources are pre-empted;
   wherein the method further comprises:
   estimating a channel busy ratio (CBR) of a sidelink resource pool associated with a sidelink channel, wherein the CBR is indicative of loading of the sidelink channel;
   selecting first transmission resource or making a preemption indication (PI) monitoring decision based on whether the estimated CBR is greater than a pre-defined CBR threshold;
   wherein the first UE that fails to reserve a resource after a predetermined number of attempts reduces the pre-defined CBR threshold.

3. A method of claim 1, wherein the CBR is a ratio of available resources in the sidelink resource pool.

4. A method of claim 1, wherein the CBR is a ratio taking into account scattering of available resource across the sidelink channel.

5. A method of claim 1, wherein the pre-defined CBR threshold is a threshold considering traffic priority level.

6. A method of claim 1, wherein the pre-defined CBR threshold for the first UE is decreased based on a remaining time budget before a sidelink transmission deadline.

7. A method of claim 1, wherein a preemption indication (PI) is transmitted by the first UE in the last N sidelink control information (SCI) occasions before a transmission instant of the sidelink transmission, and wherein the number N of SCI occasions to be monitored for the PI is pre-configurable.

8. A method of claim 2, wherein occurrence of the overlapping is an instance of the PI.

9. A method of claim 2, wherein the CBR is a ratio of available resources in the sidelink resource pool.

10. A method of claim 2, wherein the CBR is a ratio taking into account scattering of available resource across the sidelink channel.

11. A method of claim 2, wherein the pre-defined CBR threshold is a threshold considering traffic priority level.

12. A method of claim 2, wherein the pre-defined CBR threshold for the first UE is decreased based on a remaining time budget before a sidelink transmission deadline.

13. A method of claim 2, wherein a preemption indication (PI) is transmitted by the first UE in the last N sidelink control information (SCI) occasions before a transmission instant of the sidelink transmission, and wherein the number N of SCI occasions to be monitored for the PI is pre-configurable.

* * * * *